US012596755B1

(12) United States Patent (10) Patent No.: US 12,596,755 B1

Carter et al. (45) Date of Patent: Apr. 7, 2026

(54) QUERY BUILDING USING GENERATIVE ARTIFICIAL INTELLIGENCE

(71) Applicant: Hound Technology, Inc., San Francisco, CA (US)

(72) Inventors: Phillip Michael Carter, Redmond, WA (US); Tatsiana Ramankova, Bonney Lake, WA (US); Craig Adams Atkinson, Shoreview, MN (US); Sarah Jeanne Voegeli, Golden, CO (US)

(73) Assignee: Hound Technology, Inc., San Francisco, CA (US)

( * ) Notice: Subject to any disclaimer, the term of this patent is extended or adjusted under 35 U.S.C. 154(b) by 0 days.

(21) Appl. No.: 18/652,804

(22) Filed: May 1, 2024

Related U.S. Application Data

(60) Provisional application No. 63/499,691, filed on May 2, 2023.

(51) Int. Cl.
    *G06F 16/9532* (2019.01)
(52) U.S. Cl.
    CPC ................................ *G06F 16/9532* (2019.01)
(58) Field of Classification Search
    CPC ............. G06F 16/9532; G06F 16/3329; G06F 16/243; G06F 16/9032
    USPC ......................................................... 707/765
    See application file for complete search history.

(56) References Cited

U.S. PATENT DOCUMENTS

| | | | |
|---|---|---|---|
| 2013/0204811 A1* | 8/2013 | Morinaga | ........... G06F 16/2453 706/12 |
| 2020/0104737 A1* | 4/2020 | Abaci | .................... G06N 20/00 |

| | | | |
|---|---|---|---|
| 2023/0281193 A1* | 9/2023 | Alakuijala | ............. G06N 3/092 706/12 |
| 2024/0127617 A1* | 4/2024 | Amamou | ......... G06V 30/19133 |
| 2024/0296279 A1* | 9/2024 | Gardner | ................ G06F 40/169 |
| 2024/0303711 A1* | 9/2024 | Tan | ..................... G06Q 30/0635 |
| 2024/0338361 A1* | 10/2024 | Hazel | .................. G06F 16/2423 |

(Continued)

FOREIGN PATENT DOCUMENTS

| | | | | |
|---|---|---|---|---|
| CN | | 113806502 A | * 12/2021 | ............. G06N 3/044 |

OTHER PUBLICATIONS

Troy et al., "Enabling Generative AI to Produce SQL Statements: A Framework for the Auto-Generation of Knowledge Based on EBNF Context-Free Grammars", In IEEE Access, vol. 11, pp. 123543-123564, 2023. (Year: 2023).*

(Continued)

*Primary Examiner* — Phuong Thao Cao

(74) *Attorney, Agent, or Firm* — Patent Law Works LLP

(57) ABSTRACT

A system and method for building queries using generative artificial intelligence (AI) is described. In an example implementation, the system may include an observability platform configured to receive a user request to use generative artificial intelligence in association with a query on an observability platform. A blob of text may be generated based on the request and include information needed to execute a valid query on the observability platform. A server may be configured to include a generative AI engine and a web service to respond to the blob of text. The observability platform may determine whether the response from the generative AI engine is a valid query, meeting a threshold quality level. User feedback may be requested from the user to determine whether the query results answered the user input for query assistance.

20 Claims, 9 Drawing Sheets

(56) References Cited

U.S. PATENT DOCUMENTS

| | | | |
|---|---|---|---|
| 2024/0346021 A1* | 10/2024 | Xuan | G06F 40/20 |
| 2024/0362019 A1* | 10/2024 | El Hattami | G06F 16/3329 |
| 2024/0362214 A1* | 10/2024 | Lyon | G06F 16/243 |
| 2024/0362468 A1* | 10/2024 | Lee | G06N 3/047 |
| 2025/0086213 A1* | 3/2025 | Dilipkumar | G06F 16/24522 |
| 2025/0094171 A1* | 3/2025 | Isaacson | G06F 9/30079 |
| 2025/0110976 A1* | 4/2025 | Channapattan | G06F 40/205 |
| 2025/0321967 A1* | 10/2025 | Strader | G06F 16/24553 |

OTHER PUBLICATIONS

Yaghmazadeh et al., "SQLizer: Query Synthesis from Natural Language", Proceedings of the ACM on Programming Languages, vol. 1, Issue Oopsla, Article No. 63, pp. 1-26, Oct. 2017. (Year: 2017).*

* cited by examiner

200

220

104

| Communication Unit 202 | | User Application 110 |

| Processor 204 | | Web Service 124 |

| | | Data Analysis Engine 126 |

| Memory 206 | | Database Schema Module 132 |

| | | Generative AI Engine 122 |

| Data Storage 208 | | Generative AI Response Modification Module 134 |

| | | Query Validation Module 136 |

| Input/Output Device 214 | | Query Building Engine 104 |

| Display Device 216 | | User Feedback Module 138 |

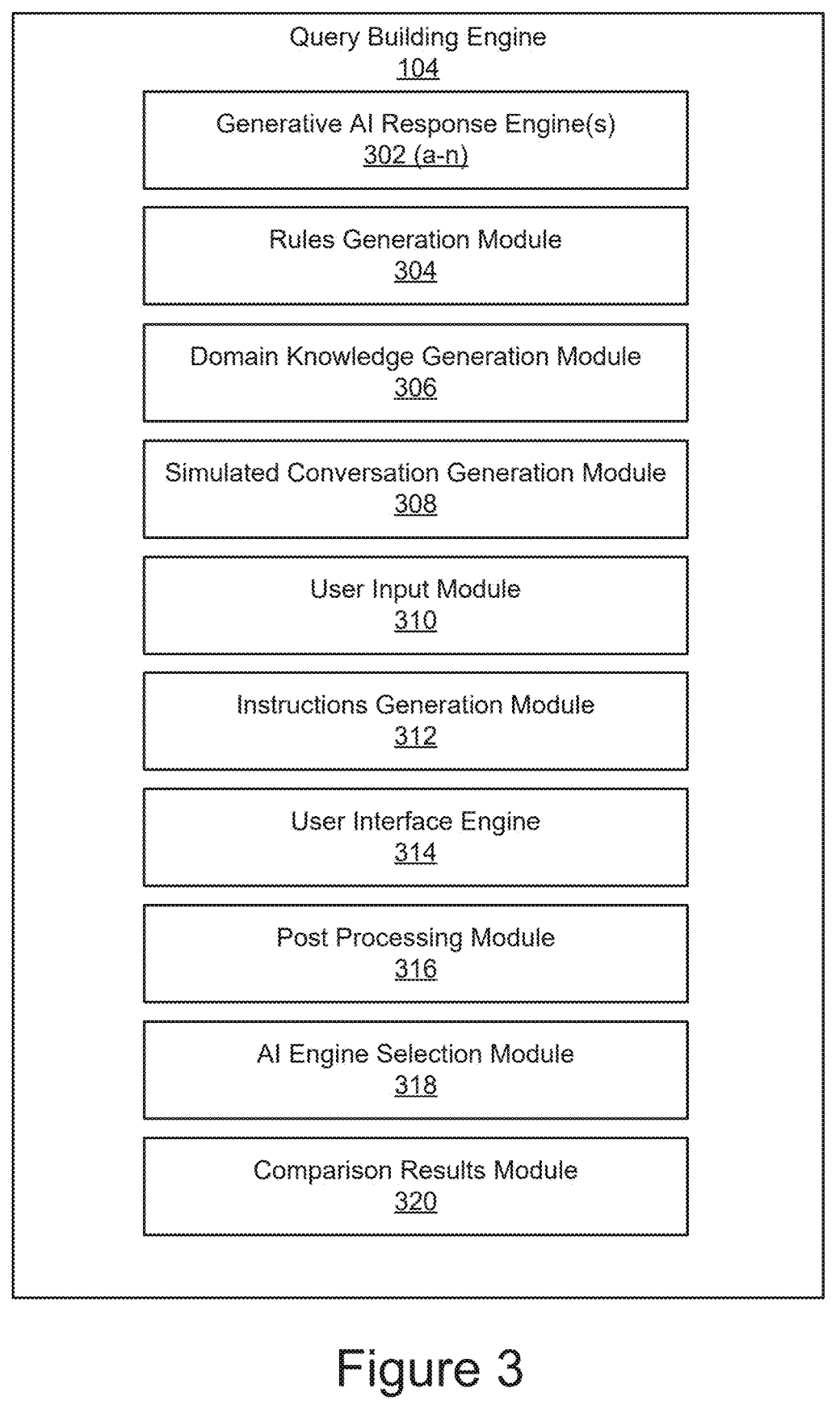

Query Building Engine
104

Generative AI Response Engine(s)
302 (a-n)

Rules Generation Module
304

Domain Knowledge Generation Module
306

Simulated Conversation Generation Module
308

User Input Module
310

Instructions Generation Module
312

User Interface Engine
314

Post Processing Module
316

AI Engine Selection Module
318

Comparison Results Module
320

Figure 3

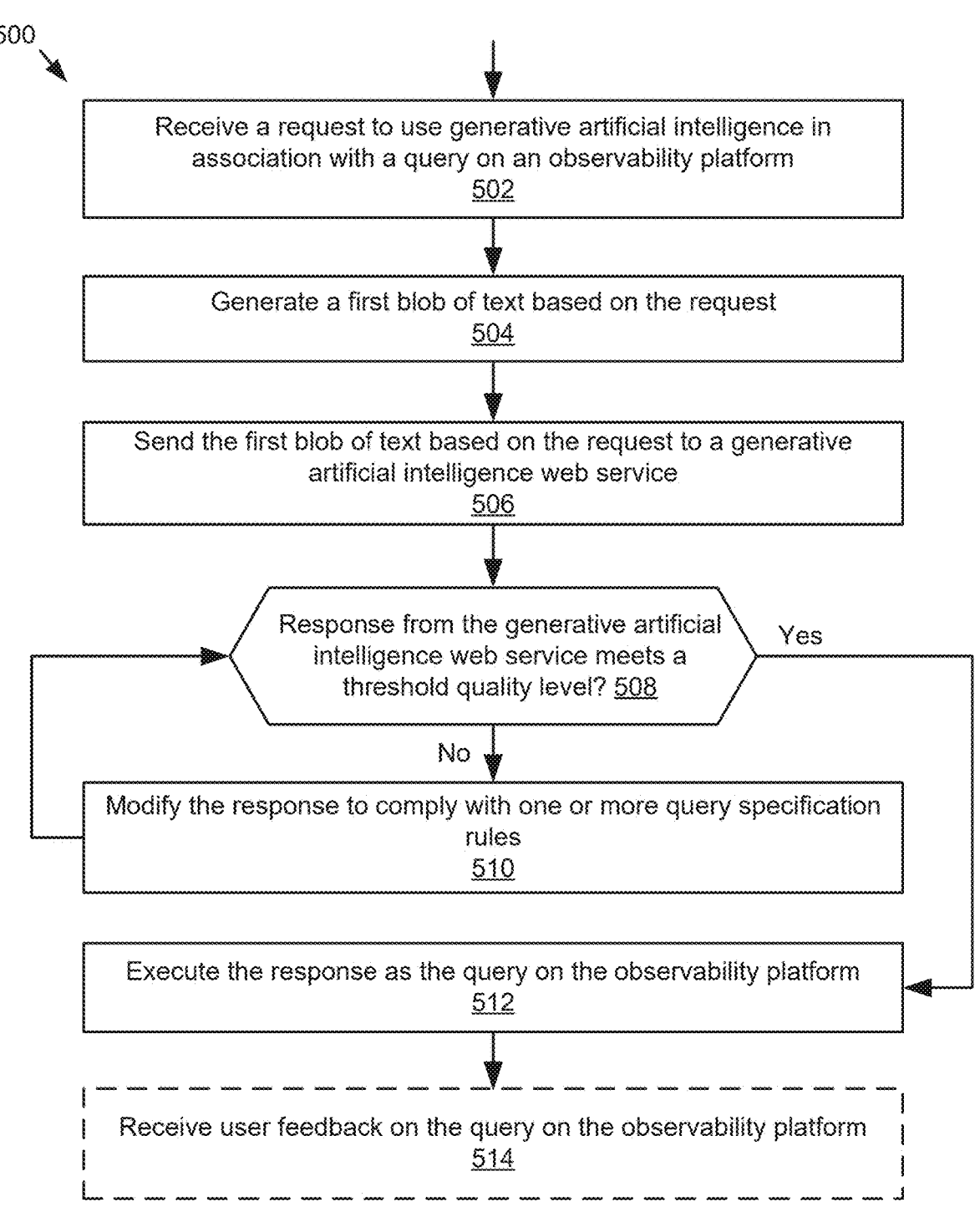

500

Receive a request to use generative artificial intelligence in association with a query on an observability platform
502

Generate a first blob of text based on the request
504

Send the first blob of text based on the request to a generative artificial intelligence web service
506

Response from the generative artificial intelligence web service meets a threshold quality level? 508

Yes

No

Modify the response to comply with one or more query specification rules
510

Execute the response as the query on the observability platform
512

Receive user feedback on the query on the observability platform
514

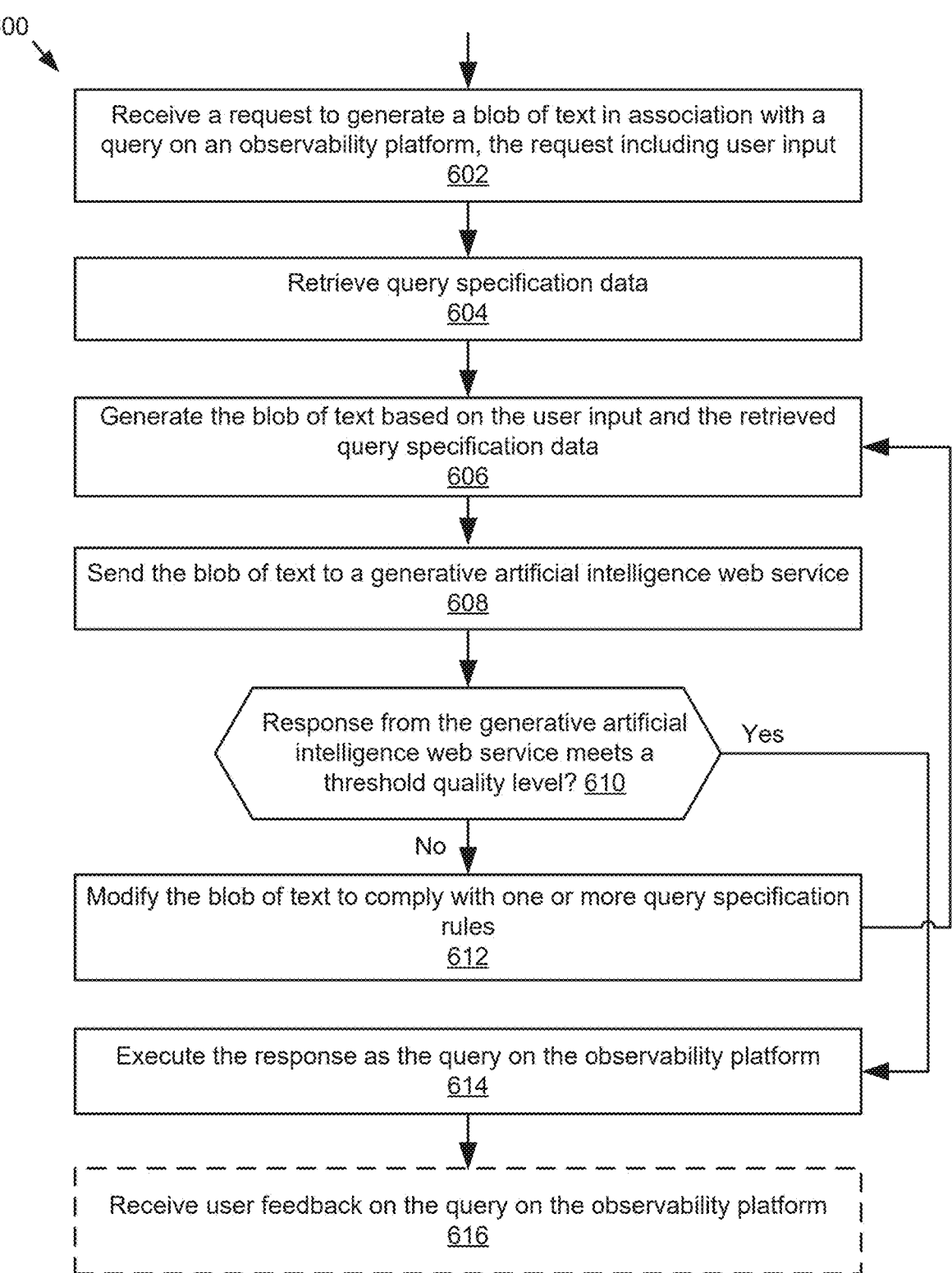

Receive a request to generate a blob of text in association with a query on an observability platform, the request including user input
602

Retrieve query specification data
604

Generate the blob of text based on the user input and the retrieved query specification data
606

Send the blob of text to a generative artificial intelligence web service
608

Response from the generative artificial intelligence web service meets a threshold quality level? 610

Yes

No

Modify the blob of text to comply with one or more query specification rules
612

Execute the response as the query on the observability platform
614

Receive user feedback on the query on the observability platform
616

Figure 6

QUERY BUILDING USING GENERATIVE ARTIFICIAL INTELLIGENCE

CROSS-REFERENCE TO RELATED APPLICATION

This application claims priority to U.S. Provisional Patent Application Ser. No. 63/499,691, filed on May 2, 2023, which is hereby incorporated by reference in its entirety.

BACKGROUND

The present disclosure relates to systems and methods for querying large data sets. In particular, the present disclosure relates to systems and methods for query building using generative artificial intelligence.

In recent years, tracking and optimizing performance of Internet-enabled software applications has generated larger and larger data sets. In particular, various application performance monitoring (APM) solutions have emerged to enable organizations improve user experiences by tracking key software application performance metrics using monitoring software and telemetry data. With the abundance of data available, and with increasing complexity and structures, it is often difficult to generate a specific query to identify the root causes that may affect the user experience, such as latency. Specifically, as software applications are updated to fix bugs, release new features, and/or deploy applications on more complex structures, such as distributed systems or cloud computing platforms, the user experience may be negatively affected for reasons that are harder to determine. As such, there is a persistent need to improve the tools used to investigate and query the large amounts of data used to observe the performance of software applications.

SUMMARY

The present disclosure relates to an observability platform that enables performance monitoring data to be queried using generative artificial intelligence. An observability platform relies on user-supplied and/or user-managed data stores that are accessed through the Internet. The observability platform receives a request to use generative artificial intelligence in association with a multitude of contextual data to produce a query on the observability platform, which the observability platform then executes on behalf of the user. A first blob of text may be generated based on the request and the contextual data. This blob of text may include various types of information specific to the observability platform, such as a description of rules that make up a valid query, a list of algorithmically-determined relevant names in a database schema that a user will query, a list of domain knowledge metadata such as special column names and what they mean, a list of user-supplied named examples of queries, a set of examples simulating a conversation with a generative artificial intelligence (AI) web service, the user's input, an existing query if present, and instructions to follow, such as to produce a query object in executable programmatic code. The generative AI web service may then return an object, such as a JavaScript Object Notation (JSON) object, that represents a valid query in the observability platform. The object is configured to conform to the details specified in a query specification document that describes the rules that make up a valid query in the observability platform. If the response from the generative AI web service is wholly invalid, i.e., nothing can be extracted to run as a valid query in the observability platform, the user is prompted to enter new input to try again. If the response is a query that includes some invalid contents or substructures, a process to adjust the response to insert new contents known to be valid, update partially invalid contents, or remove the invalid contents is executed. The resulting modified response is then enqueued onto the observability platform's query engine. At this point, the query is run through the observability platform's query engine as if the user had manually entered the query through the user interface of the observability platform. This includes displaying the results that match the query that was executed, storing the query into a historical record of executed queries, enabling the query to be acted upon (e.g., named, assigned to a collection of queries (a "Board") or made as a decision point that causes another action to be performed (a "Trigger")). Furthermore, the query may be further modified and re-run by the user.

Additionally, user feedback on the query may be requested through a user interface, such as a banner asking the user if the query helped answer their prompt. The user may respond with "yes," "no," or "unsure," for example. The user feedback responses are tracked and correlated with several other pieces of metadata to enable administrators of the observability platform to better understand what can lead to certain user feedback responses by the user.

Other implementations of one or more of these aspects and other aspects include corresponding systems, apparatus, and computer programs, configured to perform the various action and/or store various data described in association with these aspects. Numerous additional features may be included in these and various other implementations, as discussed throughout this disclosure.

The features and advantages described herein are not all-inclusive and many additional features and advantages will be apparent in view of the figures and description. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 3 is a block diagram illustrating a query building engine of the observability platform in accordance with some implementations.

FIG. 5 is an example flowchart diagram illustrating a method of query building using generative artificial intelligence in accordance with some implementations.

FIG. 6 is an example flowchart diagram illustrating a method of generating a blob of text to send to a generative artificial intelligence web service in accordance with some implementations.

DETAILED DESCRIPTION

Figure 1:
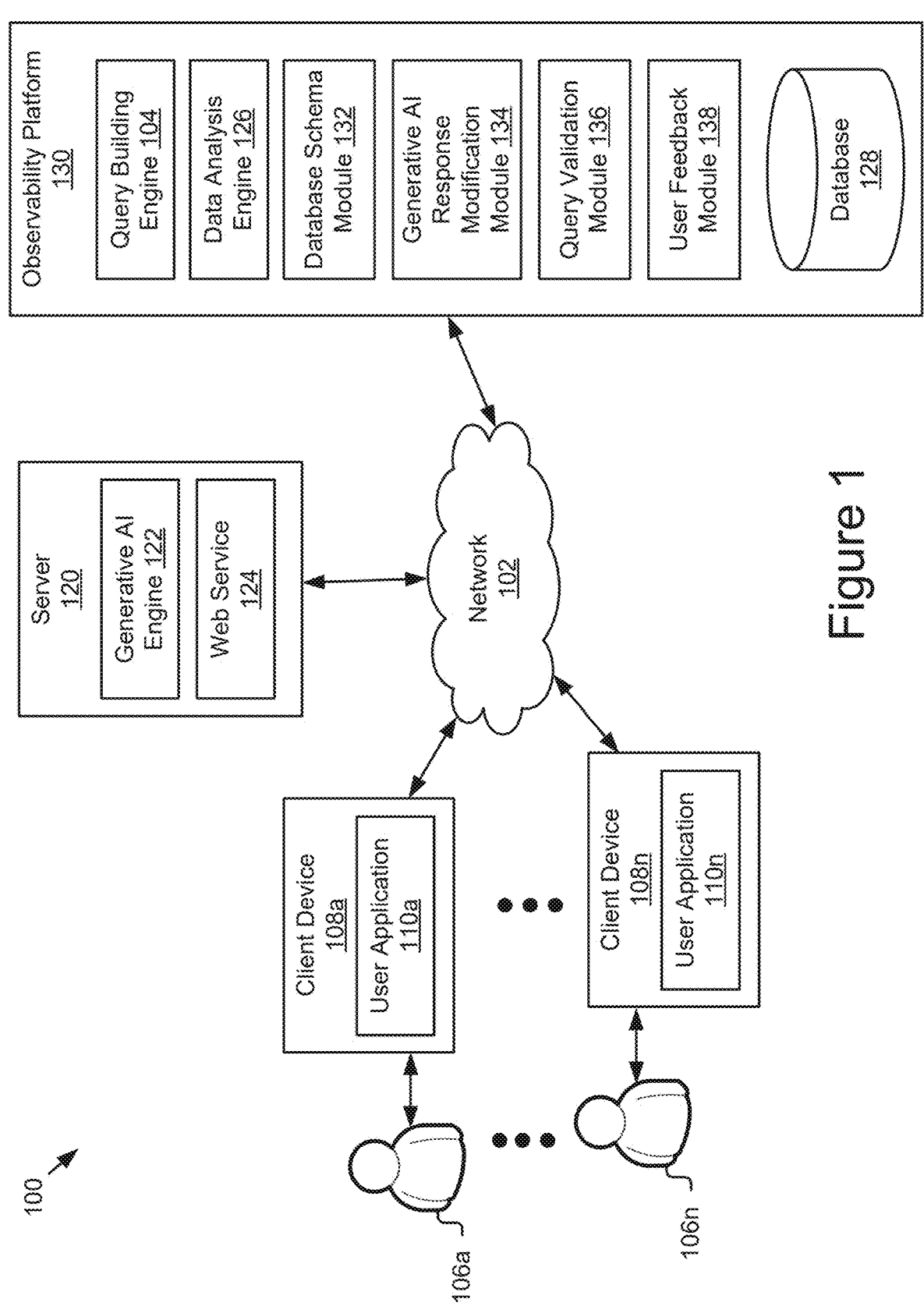
FIG. 1 is a high-level block diagram illustrating a system including an observability platform in accordance with some implementations.

As set forth in detail below, the technology described herein provides an innovative approach to building queries for large data sets. In particular, the systems and methods described below advantageously enable a user to build complex queries using generative artificial intelligence in an observability platform. Part of this process includes embedding a user interface that receives user input that identifies the type of problem or issue that the user intends to investigate. The user interface enables a process to generate a blob of text that includes various information specific to the observability platform, such as a description of rules that make up a valid query, a list of names in a database schema that a user will query, a list of domain knowledge metadata such as special column names and what they mean, a set of examples simulating a conversation with a generative artificial intelligence (AI) web service, the user's input, and instructions to follow, such as produce a query object in executable programmatic code. After generating the blob of text, the blob of text is sent to a generative AI web service. A response from the generative AI web service is then evaluated to determine whether the response meets a threshold quality level. For example, the response may be wholly invalid, meaning that the response cannot be executed as a regular query in the observability platform. As another example, the response may have a valid format for an executable query but may also include invalid content items or substructure that may be removed to result in a valid query. A process is used to determine whether the response meets the threshold quality level. If the response meets the threshold quality level, then the response is executed as the query on the observability platform. Otherwise, the response is modified as described above, or the user is prompted to try a new input.

While the present disclosure will now be described below with regard to databases and/or data stores of performance data metrics of production systems connected, through a network, to an observability platform and the query building assistant user interface used to generate query objects that can be validly executed on the observability platform, it should be understood that the databases and/or data stores described are just one example type of data that may be used with the present disclosure. The present disclosure is applicable to various other types of data including but not limited to relational databases, structured data, unstructured data, NoSQL databases, JSON databases, and so forth.

With reference to the figures, reference numbers may be used to refer to components found in any of the figures, regardless whether those reference numbers are shown in the figure being described. Further, where a reference number includes a letter referring to one of multiple similar components (e.g., component 106*a*, 106*b*, and 106*n*), the reference number may be used without the letter to refer to one or all of the similar components.

FIG. 1 is a high-level block diagram illustrating an example system 100 for building queries in an observability platform using generative artificial intelligence.

The illustrated system 100 may include client devices 108*a* . . . 108*n* (also referred to herein individually and/or collectively as 108) that can be accessed by users 106*a* . . . 106*n*, a server 120, and an observability platform 130, which are electronically communicatively coupled via a network 102 for interaction and electronic communication with one another, although other system configurations are possible including other devices, systems, and networks. For example, the system 100 could include any number of client devices 108, servers 120, observability platforms 130, networks 102, and other systems and devices. In some implementations, the observability platform 130 may be located remotely (e.g., separately off the network or physical location) from one or both of the client devices 108 and the server 120.

The network 102 may be a conventional type, wired or wireless, and may have numerous different configurations including a star configuration, token ring configuration, or other configurations. Furthermore, the network 102 may include any number of networks and/or network types. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, personal area networks (PANs) (e.g., Bluetooth® communication networks), peer-to-peer networks, near field networks (e.g., NFC, etc.), and/or other interconnected data paths across which multiple devices may communicate, various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client devices 108*a* . . . 108*n* (also referred to individually and collectively as 108) may be computing devices having data processing and communication capabilities. In some implementations, a client device 108 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The client devices 108*a* . . . 108*n* may couple to and communicate with one another and the other entities of the system 100 via the network 102 using a wireless and/or wired connection, such as the local hub or the application server. Examples of client devices 108 may include, but are not limited to, mobile phones, tablets, laptops, desktops, netbooks, server appliances, servers, virtual machines, smart TVs, media streaming devices, or any other electronic device capable of accessing a network 102. The system 100 may include any number of client devices 108, including client devices 108 of the same or different type. A plurality of client devices 108*a* . . . 108*n* are depicted in FIG. 1 to indicate that the server 120 and observability platform 130 may interact with multiplicity of users 106*a* . . . 106*n* on a multiplicity of client devices 108*a* . . . 108*n*.

The client devices 108 may also store and/or operate other software such as a user application 110 (e.g., an instance of a user application 110*a* . . . 110*n*), an operating system, other applications, etc., that are configured to interact with the server 120 and/or the observability platform 130 via the network 102. In some implementations, the client device 108 may run a user application 110. For example, the user application 110 may be one or more of web, mobile, enterprise, and cloud application. The user application 110 may communicate with the server 120 and the observability platform 130. For example, the user application 110 may include a browser that may run JavaScript or other code to access the functionality provided by other entities of the system 100 coupled to the network 102. The user application 110 may connect to the server 120 via the web service 124, send one or more blobs of text, receive response data from the server 120, send the response data to the observability platform 130, and display the results on the client device 108. In some implementations, the client devices 108 may be implemented as a computing device 200 as will be described below with reference to FIG. 2.

In the example of FIG. 1, the entities of the system 100, such as the server 120 and the observability platform 130 may be, or may be implemented by, a computing device including a processor, a memory, applications, a database, and network communication capabilities similar to that described below with reference to FIG. 2. In some implementations, each one of the entities 120 and 130 of the system 100 may be a hardware server, a software server, or a combination of software and hardware.

The server 120 may include data processing, storing, and communication capabilities, as discussed elsewhere herein. For example, the server 120 may include one or more hardware servers, server arrays, storage devices, centralized and/or distributed/cloud-based systems, etc. In some implementations, the server 120 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, the server 120 may be a Hypertext Transfer Protocol (HTTP) server, a Representational State Transfer (REST) service, or other server type, having structure and/or functionality for processing and satisfying content requests and/or receiving content from the other entities coupled to the network 102. The server 120 may implement one or more stateful services and store session state for one or more client devices 108 interacting with it. For example, the server 120 may keep track of one or more requests from client devices 108, which client device has opened which file, current read and write pointers for files, which files are locked by which client device 108, etc.

In some implementations, the server 120 may be remote to the client device 108 and/or the observability platform 130, such that the server 120 communicates with the observability platform 130 to perform functions, thereby reducing complexity of the server 120. In the example of FIG. 1, the server 120 may include a web service 124 and a generative AI engine 122. The web service 124 may be dedicated to providing access to various services and information resources hosted by the server 120 via web, mobile, enterprise, and/or cloud applications. The web service 124 may include one or more of a software as a service, infrastructure as a service, platform as a service, function as a service, etc. For example, the web service 124 may include on-demand cloud computing service and associated application programming interface (API) for providing distributed computing processing capacity and software tools. In another example, the web service 124 may include allowing users to rent a virtual cluster of machines for deploying applications. It should be noted that the list of services provided as examples for the web service 124 above are not exhaustive and that others are contemplated in the techniques described herein.

In an embodiment, the generative AI engine 122 may comprise a third-party generative AI engine, such as OpenAI's gpt-3.5-turbo, accessible through an API. In such an embodiment, the server 120 comprises a third-party server, wherein the web service 124 comprises the API through which gpt-3.5-turbo is accessed. In another embodiment, the generative AI engine 122 may comprise any licensed generative AI engine incorporated into the system of the observability platform. As such, the generative AI engine 122 may be closely integrated into the existing operations of the observability platform. In other embodiments, the generative AI engine 122 may comprise a specialized generative AI engine tuned for a specific type of use case, such as performance monitoring of software applications used in production.

The observability platform 130 may include data processing, storing, and communication capabilities, as discussed in a related application, U.S. application Ser. No. 17/837,924, titled "Impatient System for Querying Stateless Computing Platforms," and filed on Jun. 10, 2022, hereby incorporated by reference. The observability platform 130 may be implemented as a serverless computing architecture that allocates machine resources on demand to perform one or more computational tasks. The observability platform 130 may rely on the server 120 to maintain session state. In the example of FIG. 1, the observability platform 130 may include a query building engine 104 that uses an impatient query engine and lambda function(s) (not pictured). A lambda function may be a self-contained serverless application code written in a supported language and runtime to perform one or more computational tasks. For example, a function may be an independent unit of execution and deployment, such as a microservice. The observability platform 130 is configured to execute many instances of the same function or of different functions in an efficient and flexible manner. The observability platform 130 executes each function in its own container. For example, when a function is created, the observability platform 130 packages it into a new container and executes that container on a multi-tenant cluster of machines on demand. In some implementations, the observability platform 130 executes one or more functions in response to events (e.g., multiple individual requests with associated timestamps) and automatically manages the computing resources required by that code. For example, the observability platform 130 may be configured to receive HTTP requests from the server 120 via an API of the web service 124, automatically provision back-end services triggered by the HTTP requests, and deallocate such services when corresponding application code is not in use. The observability platform 130 sends the response generated by the functions for individual requests to the server 120 which then collates the responses into a final result. In some implementations, the observability platform 130 may also include a database 128 to store structured data in a relational database and a file system (e.g., HDFS, NFS, etc.) for unstructured or semi-structured data. In some implementations, the observability platform 130 may include an instance of a data storage that stores various types of data for access and/or retrieval by the impatient query engine. For example, the data store may store response data for a set of requests. Other types of user data are also possible and contemplated. It should be understood that a single observability platform 130 may be representative of a cloud computing service provider and there may be multiple cloud computing service providers coupled to the network 102, each having its own server or a server cluster, applications, application programming interface, etc.

In an embodiment, the query building engine 104 may include software and/or logic to provide the functionality for enabling a user of the observability platform to use natural language processing (NLP) to generate an executable query using a generative AI as described above. In some implementations, the query building engine 104 may be implemented using programmable or specialized hardware, such as a field-programmable gate array (FPGA) or an application-specific integrated circuit (ASIC). In some implementations, the query building engine 104 may be implemented using a combination of hardware and software. In some implementations, the query building engine 104 may be stored and executed on various combinations of the client device 108, the server 120, and the observability platform 130, or by any one of the client devices 108, the server 120, or the observability platform 130. As depicted in FIG. 1, the query building engine 104 is shown to indicate that the operations performed by the query building engine 104 as described herein may be performed at the observability platform 130. In other implementations, the query building engine 104 may be a thin-client application with some functionality executed on the server 120 and additional functionality executed on the observability platform 130. While the query building engine 104 is described below as a stand-alone component, in some implementations, the query building engine 104 may be part of other applications in operation on the client device 108, the server 120, and the observability platform 130.

As further illustrated in FIG. 1, the observability platform 130 may include software and/or logic to provide the functionality for generating blobs of text to enable a generative artificial intelligence to produce a response to received user input that is in a valid format and/or syntax for the observability platform 130 to execute the response as programmatic code according to an embodiment. For example, the observability platform 130 may include a data analysis engine 126, a database schema module 132, a generative AI response modification module 134, a query validation module 136, and a user feedback module 138.

The data analysis engine 126 may include software and/or logic to provide the functionality for analyzing data accessible by the observability platform 130 as managed by users 106 of the observability platform 130. For example, users 106 may rely on the observability platform 130 to gain insights into various performance metrics regarding a software application in production on a third party server and/or service accessible through network 102. The software application may include any number of software services and be structured according to any number of software designs. For the purposes of illustration only, an example software application may be in an e-commerce use case, such as where the software application is used to sell products and/or services on a website and/or mobile application. The software application may include a checkout software service that applies a discount code, such as the word "YOINK" as well as other discount codes, like "FF20OFF" and "JUICY," among other words. The data analysis engine 126 may execute one or more various queries that are associated with one or more service level objectives ("SLOs") which indicate, when result(s) meets a threshold, that the one or more SLOs will be violated. Continuing the example above, an error budget for an SLO, "Customers can check out" using the software application, may be in danger of being exhausted because the "/cart/checkout endpoint returns 200 within 1.2 s, 99% of the time over 2 days." This information may be delivered by the observability platform 130 as a notification to other communication systems accessible by users 106, such as SLACK. The notification is an example of a "Trigger" which executes an action when a query in the observability platform 130 returns a result that meets a criteria for the Trigger. The data analysis engine 126 may include functionality to manage Triggers in the observability platform 130, for example.

The data analysis engine 126 may further include functionality to generate data visualizations, group data by columns, and report data according to pre-programmed templates. For example, various graphs may be generated to show how much of the error budget remains after the last 1 days (e.g., a line graph plotting the error budget on a y-axis over time on an x-axis and displaying the current error budget of 67.14%). Additionally, derived columns and other data may be produced by the data analysis engine 126 to offer different vantage points and views of the data. Continuing the example, an SLI ("Service Level Indicator") may be a programmatic block of text that is derived from a column of data. An SLI is one type of programmatic code that can be executed in the observability platform 130. A graph may be shown to a user 106 of the observability platform 130 that shows how often the SLI has succeeded over the preceding 1 days (e.g., a line graph plotting the SLI on a y-axis over time on an x-axis and displaying the current SLI at 99.73%).

The data analysis engine 126 may generate other types of visualizations, such as a heat map user interface that plots data points that represent some quantity of requests to the software application being monitored. The user 106 may selectively interact with the heat map user interface to investigate and determine what may be causing a slowdown at the endpoint (e.g., the shopping cart checkout endpoint described in the Trigger notification above). The heat map user interface may use shades of colors to indicate quantity of number of requests, such as darker shades representing more requests. The data points may be graphed such that the higher on the y-axis, the data points indicate that the longer duration of time of the request. These data points can further be graphed over time on the x-axis. The resulting heat map user interface shows that darker data points that are higher indicate a larger number of requests that take a longer time to complete. The user 106 may then select those higher, darker data points through the heat map user interface to isolate the data set and further investigate what may be causing the slowdown and/or latency.

The data analysis engine 126 may further display a story of each request as a trace, showing the request coming in at a "frontend" service, through "checkout," "cart," and "productcatalog", including the names of software modules being called within each service. For example, after clicking on a slower dot in the above-mentioned heat map user interface, a specific trace may show the amount of time (e.g., duration) that elapsed to execute a specific request, such as "getDiscounts" in the "checkout" service, showing a horizontal bar graph of the duration 1.676 seconds. Different colors may be used to identify the different services and the duration of the requests, in an embodiment. Upon selection of the bar graph of 1.676 seconds, a complete listing of the various commands in SQL statements may be shown (e.g., "SELECT checkout.discounts") and the amount of time for each command (e.g., 131.1 ms, 202.4 ms, 112.2 ms, 166.3 ms, 112.8 ms, 117.7 ms, and so on). In this way, the data analysis engine 126 enables a user 106 a complete vantage point on what commands in the software application being monitored may be repeating or taking too long to process. Other metadata may be shown related to the request, such as the fields of the request, including "Timestamp," "app_dis-count_code," "app_userid," "app.yeeted," and "dura-tion_ms" among other data fields. The data analysis engine 126 may be set up with any number of fields in the observability platform 130. The user 106 may select on each part of the particularly long request to see a breakdown of what SQL queries are being performed. In this example, the same SQL query may be repeated over and over, indicating that there may be an issue or bug to fix.

The data analysis engine 126 may further parse data according to the fields and database schema described that represents the software application being monitored. For example, a database schema module 132 may include soft-ware and/or logic to provide the functionality for managing the database schema related to the software application being monitored. In this example above, a column may include "app.discount_code" and a derived column may include "customer_checkout_sli" to indicate that the SLI exists or doesn't exist. The database schema module 132 may also enable user 106 to selectively choose which data is included in a data set through a graphical user interface. For example, the user 106 may selectively highlight various data points that seem to be outliers (e.g., higher than other data points in a heatmap interface) and then select on a "GROUP BY" field in the user interface to include or exclude various columns in a query. The "GROUP BY" field may be prepopulated with various columns, such as "app-.discount_code" and "customer_checkout_sli" and the user 106 may unselect "customer_checkout_sli" as an option. Thus, in just a few clicks in the user interface, different data sets may be examined without writing out a specific query in executable programmatic code.

The query building engine 104 may include a user inter-face that enables the user to input natural language text to simplify the process further. For example, as shown in an example screenshot illustrated in FIG. 7, a user may input "slow requests" in a "Query Assistant" text field and then click on a "Get Query" button. A first blob of text is generated that includes various types of information specific to the observability platform 130, such as a description of rules that make up a valid query, a list of algorithmically-determined relevant names in a database schema that a user will query (e.g., based on the database schema module 132), a user-provided list of named examples of queries, a list of domain knowledge metadata such as special column names and what they mean (e.g., derived column names that are produced from programmatic code), a set of examples simulating a conversation with a generative artificial intel-ligence (AI), the user's input, an existing query if present, and instructions to follow, such as "produce a query object" according to a query specification that results in executable programmatic code. The set of examples simulating a con-versation with a generative AI may be stored in a database 128, in an embodiment, and retrieved on-demand.

The query building engine 104 may then send the first blob of text to the generative AI engine 122 on the server 120 through the web service 124. In an embodiment, the gen-erative AI engine 122 may comprise a model that interacts in a conversational way. The dialogue format enables the model to answer follow up questions, admit its mistakes, challenge incorrect premises, and reject inappropriate requests. In another embodiment, the generative AI engine 122 may compromise a model that produces only an output in the desired format, offering no inherent way for a user to interact with it in a conversational manner. In this other embodiment, the rest of the observability platform provides affordances for the user to adjust outputs, provide feedback, or otherwise arrive at a response that they prefer. In another embodiment, the generative AI engine 122 may continually generate responses, or multiple responses to the same inputs, until completion criteria are met before passing the response on to the next stage of the system. The generative AI engine 122 may comprise a large language model (LLM) that can follow complex instructions in natural language and solve difficult problems with accuracy. A large language model (LLM) is a language model comprising a neural network with many parameters (e.g., billions of weights or more), trained on large quantities of unlabeled text using self-supervised learning or semi-supervised learning. GPT-3.5 is an example model provided by OpenAI that includes a set of models that improve on GPT-3 and can understand as well as generate natural language or code. GPT-4 is another example model provided by OpenAI that includes a set of models that improve on GPT-3.5 and can understand as well as generate natural language or code. Various versions of LLMs may be used, such as "gpt-3.5-turbo" which is a cost-effective and capable model optimized for chat as well as "gpt-4" which is more capable than any GPT-3.5 model, able to input text and images and output text. Custom models may be fine-tuned by providing a set of examples with "prompts" that include example user input and "completions" that include ideal generated text. Training data for a LLM may include a couple hundred examples to increase the model quality. Performance of the model may linearly increase with every doubling of the number of examples, in an embodiment. Additionally, different AI models from disparate providers may be used by the query building engine 104, such that multiple generative AI response engines are used to handle the responses from the different AI models.

The generative AI engine 122 returns, through web ser-vice 124, an object, such as a JSON object, that represents a valid query in the observability platform 130. The object is configured to conform to the details specified in a query specification document that describes the rules that make up a valid query in the observability platform 130. The query specification document may be stored in database 128.

A query validation module 136 may include software and/or logic to provide the functionality for validating whether the response from the generative AI engine 122 can be executed as a query in the observability platform 130. If the response from the generative AI engine 122 is wholly invalid, i.e., nothing can be extracted to run as a valid query in the observability platform 130, the user 106 is prompted to enter new input to the user interface in the Query Assistant to try again. If the response is a query that includes some invalid contents or substructures, a process to remove the invalid contents is executed, as provided by the generative AI response modification module 134, in an embodiment.

A generative AI response modification module 134 may include software and/or logic to provide the functionality for modifying the response of the generative AI engine 122. For example, invalid contents may be identified, such as invalid column names, invalid syntax, and/or invalid substructures. The resulting modified response is then executed as a query in the observability platform 130. In an embodiment, the generative AI response modification module 134 processes the response returned by the generative AI engine 122 until a valid query is formed, as validated by the query validation module 136. In another embodiment, the generative AI response modification module 134 may include a programmatic "fix" to a response based on an identified issue, such as incorrect syntax, incorrect column names, incorrect special column names, and so forth. In yet another embodiment, the query validation module 136 determines a likelihood of successful execution of the query in the observability platform, and a threshold quality level may be predetermined to execute the query or modify the response.

At this point, the query is run through the observability platform's regular query engine (such as the impatient query system described above) as if the user had manually entered the query through the user interface of the observability platform 130. This includes displaying the results that match the query that was executed, storing the query into a historical record of executed queries, enabling the query to be acted upon (e.g., named, assigned to a collection of queries (a "Board") or made as a decision point that causes another action to be performed (a "Trigger"). Furthermore, the query may be further modified and re-run. This information may also be stored as a "context bundle" in addition to other information gathered by the observability platform 130, in an embodiment.

A user feedback module 138 may include software and/or logic to provide the functionality for requesting user feedback on the query through a user interface, such as a banner asking the user if the query helped answer their prompt. The user may respond with "yes," "no," or "unsure," for example. The user feedback responses are tracked and correlated with several other pieces of metadata to enable administrators of the observability platform 130 to better understand what can lead to certain user feedback responses by the user.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server 120 to a client device 108, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

Figure 2:
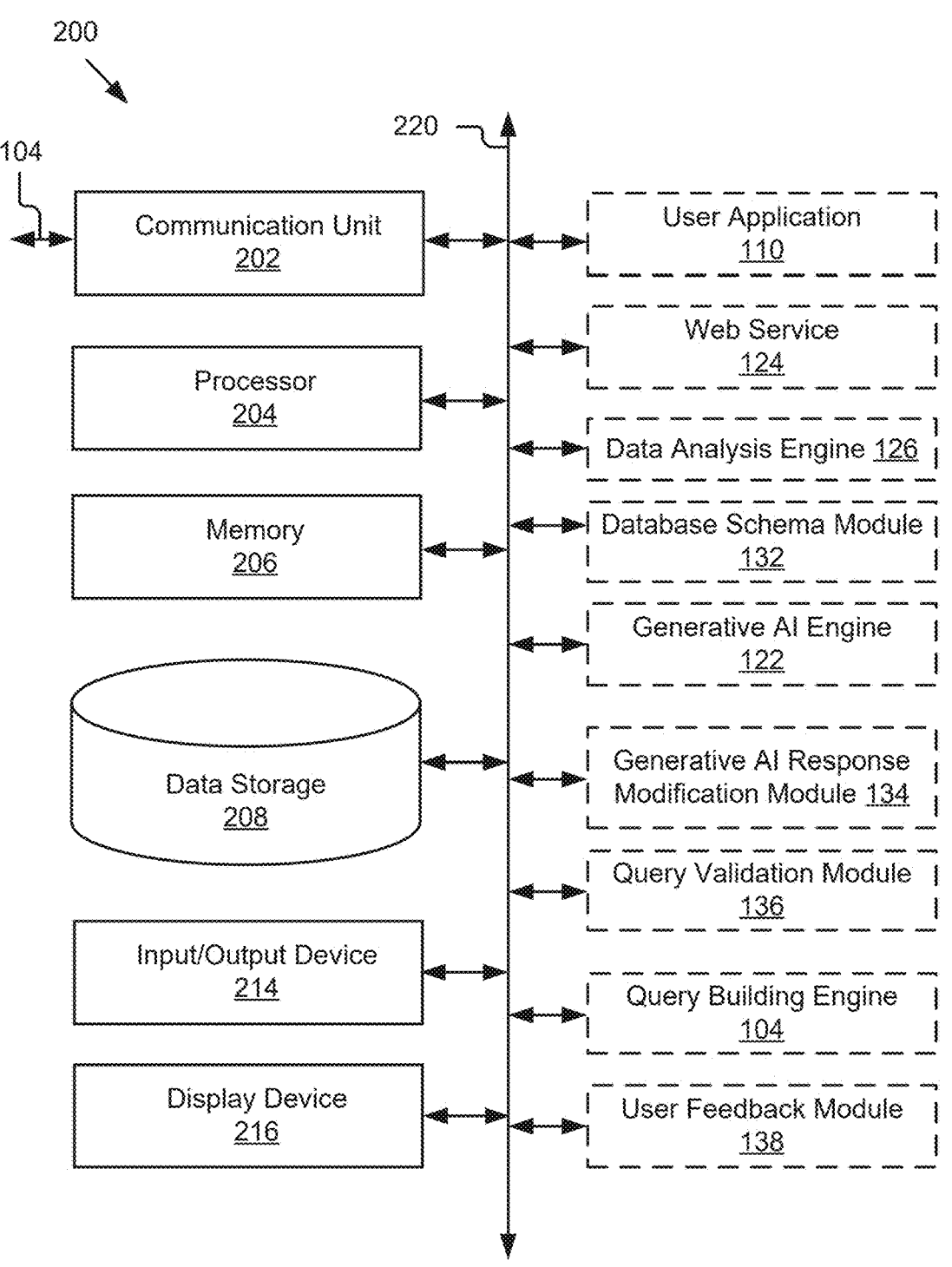
FIG. 2 is a block diagram illustrating a computing device including software modules used in the system of FIG. 1, including the observability platform in accordance with some implementations.

FIG. 2 is a block diagram of an example computing device 200 in the system 100.

The computing device 200 may include a processor 204, a memory 206, a display device 216, a communication unit 202, an input/output device(s) 214, and a data storage 208, according to some examples. The components of the computing device 200 are communicatively coupled by a bus 220. In some implementations, the computing device 200 may be representative of the client device 108, the server 120, the observability platform 130, or a combination of the client device 108, the server 120, and the observability platform 130. In such implementations where the computing device 200 is the client device 108, the server 120 or the observability platform 130, it should be understood that the client device 108, the server 120, and the observability platform 130 may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. For example, while not shown, the computing device 200 may include sensors, capture devices, various operating systems, additional processors, and other physical configurations.

As depicted in FIG. 2, the computing device 200 may include a user application 110, a web service 124, a query building engine 104, a generative AI engine 122, a data analysis engine 126, a database schema module 132, a generative AI response modification module 134, a query validation module 136, or a user feedback module 138 depending on the configuration. For instance, a client device 108 may include the user application 110; a server 120 may include the generative AI engine 122 and web service 124; and the observability platform 130 may include one or more of the query building engine 104, the data analysis engine 126, the database schema module 132, the generative AI response modification module 134, the query validation module 136, and the user feedback module 138; although other configurations are also possible and contemplated.

The user application 110 includes computer logic executable by the processor 204 on a client device 108 to provide for user interaction, receive user input, present information to the user via a display, and send data to and receive data from the other entities of the system 100 via the network 102. In some implementations, the user application 110 may generate and present user interfaces based at least in part on information received from the server 120 via the network(s) 102. The user application 110 may perform other operations described herein.

The query building engine 104 may include computer logic executable by the processor 204 to perform operations discussed elsewhere herein. The query building engine 104 may be coupled to the data storage 208 to store, retrieve, and/or manipulate data stored therein and may be coupled to the web service 124, the user application 110, and/or other components of the system 100 to exchange information therewith.

The generative AI engine 122 may include computer logic executable by the processor 204 to perform operations discussed elsewhere herein. The generative AI engine 122 may be coupled to the data storage 208 to store, retrieve, and/or manipulate data stored therein and may be coupled to the query building engine 104, the web service 124, and/or other components of the system 100 to exchange information therewith.

The data analysis engine 126 may include computer logic executable by the processor 204 to perform operations discussed elsewhere herein. The data analysis engine 126 may be coupled to the data storage 208 to store, retrieve, and/or manipulate data stored therein and may be coupled to the query building engine 104, the web service 124, and/or other components of the system 100 to exchange information therewith.

The database schema module 132 may include computer logic executable by the processor 204 to perform operations discussed elsewhere herein. The database schema module 132 may be coupled to the data storage 208 to store, retrieve, and/or manipulate data stored therein and may be coupled to the query building engine 104, the web service 124, and/or other components of the system 100 to exchange information therewith.

The generative AI response modification module 134 may include computer logic executable by the processor 204 to perform operations discussed elsewhere herein. The generative AI response modification module 134 may be coupled to the data storage 208 to store, retrieve, and/or manipulate data stored therein and may be coupled to the query building engine 104, the web service 124, and/or other components of the system 100 to exchange information therewith.

The query validation module 136 may include computer logic executable by the processor 204 to perform operations discussed elsewhere herein. The query validation module 136 may be coupled to the data storage 208 to store, retrieve, and/or manipulate data stored therein and may be coupled to the query building engine 104, the web service 124, and/or other components of the system 100 to exchange information therewith.

The user feedback module 138 may include computer logic executable by the processor 204 to perform operations discussed elsewhere herein. The user feedback module 138 may be coupled to the data storage 208 to store, retrieve, and/or manipulate data stored therein and may be coupled to the query building engine 104, the web service 124, and/or other components of the system 100 to exchange information therewith.

The web service 124 may include computer logic executable by the processor 204 to process content requests and provide access to various services and information resources. The web service 124 may include one or more of a software as a service, infrastructure as a service, platform as a service, function as a service, or other suitable service type. The web service 124 may receive content requests (e.g., product search requests, HTTP requests) from the client device 108, cooperate with the query building engine 104 to determine content, retrieve and incorporate data from the data storage 508, format the content, and provide the content to the client device 108.

In some instances, the web service 124 may format content using a web language and provide the content to a corresponding user application 110 for processing and/or rendering to the user for display. The web service 124 may be coupled to the data storage 208 to store, retrieve, and/or manipulate data stored therein and may be coupled to the query building engine 104 to facilitate its operations, for example.

The processor 204 may execute software instructions by performing various input/output, logical, and/or mathematical operations. The processor 204 may have various computing architectures to process data signals including, for example, a complex instruction set computer (CISC) architecture, a reduced instruction set computer (RISC) architecture, and/or an architecture implementing a combination of instruction sets. The processor 204 may be physical and/or virtual, and may include a single processing unit or a plurality of processing units and/or cores. In some implementations, the processor 204 may be capable of generating and providing electronic display signals to a display device 216, supporting the display of images, capturing and transmitting images, and performing complex tasks including various types of feature extraction and sampling. In some implementations, the processor 204 may be coupled to the memory 206 via the bus 220 to access data and instructions therefrom and store data therein. The bus 220 may couple the processor 204 to the other components of the computing device 200 including, for example, the memory 206, the communication unit 202, the display device 216, the input/output device(s) 214, and the data storage 208.

The memory 206 may store and provide access to data for the other components of the computing device 200. The memory 206 may be included in a single computing device or distributed among a plurality of computing devices as discussed elsewhere herein. In some implementations, the memory 206 may store instructions and/or data that may be executed by the processor 204. For example, the memory 206 may store one or more of the user application 110, query building engine 104, web service 124, generative AI engine 122, data analysis engine 126, database schema module 132, generative AI response modification module 134, query validation module 136, user feedback module 138 and their respective components, depending on the configuration. The instructions and/or data may include code for performing the techniques described herein. The memory 206 is also capable of storing other instructions and data, including, for example, an operating system, hardware drivers, other software applications, databases, etc. The memory 206 may be coupled to the bus 220 for communication with the processor 204 and the other components of the computing device 200.

The memory 206 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 204. In some implementations, the memory 206 may include one or more of volatile memory and non-volatile memory. It should be understood that the memory 206 may be a single device or may include multiple types of devices and configurations.

The bus 220 may represent one or more buses including an industry standard architecture (ISA) bus, a peripheral component interconnect (PCI) bus, a universal serial bus (USB), or some other bus providing similar functionality. The bus 220 may include a communication bus for transferring data between components of the computing device 200 or between computing device 200 and other components of the system 100 via the network 102 or portions thereof, a processor mesh, a combination thereof, etc. In some implementations, the components (e.g., 110, 124, 104, 122, 126, 132, 134, 136, 138) and various other software operating on the computing device 200 (e.g., an operating system, device drivers, etc.) may cooperate and communicate via a software communication mechanism implemented in association with the bus 220. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication may be configured to be secure (e.g., SSH, HTTPS, etc.)

The communication unit 202 is hardware for receiving and transmitting data by linking the processor 204 to the network 102 and other processing systems via signal line 104. The communication unit 202 may receive data such as requests from the client device 108 and transmit the requests to the web service 124 and query building engine 104, for example. The communication unit 202 also transmits information including media to the client device 108 for display, for example, in response to the request. The communication unit 202 is coupled to the bus 220. In some implementations, the communication unit 202 may include a port for direct physical connection to the client device 108 or to another communication channel. For example, the communication unit 202 may include an RJ45 port or similar port for wired communication with the client device 108. In other implementations, the communication unit 202 may include a wireless transceiver (not shown) for exchanging data with the client device 108 or any other communication channel using one or more wireless communication methods, such as IEEE 802.11, IEEE 802.16, Bluetooth® or another suitable wireless communication method. In yet other implementations, the communication unit 202 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still other implementations, the communication unit 202 may include a wired port and a wireless transceiver. The communication unit 202 also provides other conventional connections to the network 102 for distribution of files and/or media objects using standard network protocols such as TCP/IP, HTTP, HTTPS, and SMTP as will be understood to those skilled in the art.

The display device 216 may be any conventional display device, monitor or screen, including but not limited to, a liquid crystal display (LCD), light emitting diode (LED), organic light-emitting diode (OLED) display or any other similarly equipped display device, screen or monitor. The display device 216 represents any device equipped to display user interfaces, electronic images, and data as described herein. In some implementations, the display device 216 may output display in binary (only two different values for pixels), monochrome (multiple shades of one color), or multiple colors and shades. The display device 216 is coupled to the bus 220 for communication with the processor 204 and the other components of the computing device 200. In some implementations, the display device 216 may be a touch-screen display device capable of receiving input from one or more fingers of a user. For example, the display device 216 may be a capacitive touch-screen display device capable of detecting and interpreting multiple points of contact with the display surface. In some implementations, the computing device 200 (e.g., client device 108) may include a graphics adapter (not shown) for rendering and outputting the images and data for presentation on display device 216. The graphics adapter (not shown) may be a separate processing device including a separate processor and memory (not shown) or may be integrated with the processor 204 and memory 206.

The input/output (I/O) device(s) 214 may include any standard device for inputting or outputting information and may be coupled to the computing device 200 either directly or through intervening I/O controllers. In some implementations, the I/O device 214 may include one or more peripheral devices. Non-limiting example I/O devices 214 include a touch screen or any other similarly equipped display device equipped to display user interfaces, electronic images, and data as described herein, a touchpad, a keyboard, a pointing device, a printer, a haptic device, a scanner, an image/video capture device (e.g., camera), a stylus, an audio reproduction device (e.g., speaker), a microphone array, a barcode reader, an eye gaze tracker, a sip-and-puff device, and any other I/O components for facilitating communication and/or interaction with users. In some implementations, the functionality of the I/O device 214 and the display device 216 may be integrated, and a user of the computing device 200 (e.g., client device 108) may interact with the computing device 200 by contacting a surface of the display device 316 using one or more fingers. For example, the user may interact with an emulated (i.e., virtual or soft) keyboard displayed on the touch-screen display device 216 by using fingers to contact the display in the keyboard regions.

The data storage 208 is a non-transitory memory that stores data for providing the functionality described herein. In some implementations, the data storage 208 may be coupled to the components of the computing device 200 via the bus 220 to receive and provide access to data. In some implementations, the data storage 208 may store data received from other elements of the system 100 including, for example, entities 120, 130, 108, and/or the generative AI engine 122, and may provide data access to these entities.

The data storage 208 may be included in the computing device 200 or in another computing device and/or storage system distinct from but coupled to or accessible by the computing device 200. The data storage 208 may include one or more non-transitory computer-readable mediums for storing the data. In some implementations, the data storage 208 may be incorporated with the memory 206 or may be distinct therefrom. The data storage 208 may be a dynamic random-access memory (DRAM) device, a static random-access memory (SRAM) device, flash memory, or some other memory devices. In some implementations, the data storage 208 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data storage 308 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis.

The data stored by the data storage 208 may organized and queried using various criteria including any type of data stored by them, such as described herein. The data storage 208 may include data tables, databases, or other organized collections of data. Examples of the types of data stored by the data storage 308 may include, but are not limited to the data described with respect to the figures, for example.

FIG. 3 is a block diagram illustrating a query building engine 104 of the observability platform 130 in accordance with some implementations. The query building engine 104 may include one or more generative AI response engines 302(*a-n*) for handling the generative AI responses, a rules generation module 304 for generating, retrieving and/or managing the rules that specify a valid query in the observability platform 130, a domain knowledge generation module 306 for generating, retrieving and/or managing domain knowledge associated with the user 106, a simulated conversation generation module 308 for generating, retrieving and/or managing simulated conversations as input for the generative AI engine 122, a user input module 310 for managing the user input entered into the user interface by a user 106, an instructions generation module 312 for generating, retrieving and/or managing instructions to the generative AI engine 122, a user interface engine 314 for generating user interface elements in the query builder interface as presented on client devices 108, a post processing module 316 for generating actions that can modify generated queries through inserting new query language snippets or otherwise programmatically edit the generated queries, an AI engine selection module 318 for selecting between multiple AI engines based on various business criteria, and a comparison results module 320 for generating a comparison between results generated by multiple AI engines. As described above, the database 128 may be used to store data used by the query building engine 104 and each of its components (302(*a-n*), 304, 306, 308, 310, 312, 314, 316, 318, 320).

One or more generative AI response engines 302(*a-n*) may include software and/or logic to provide the functionality for handling the generative AI responses on one or more generative AI models, in an embodiment. For example, due to client restrictions, only one generative AI model may be used, thus only requiring one generative AI response engine 302 to handle the generative AI responses received from the generative AI model. However, in other embodiments, multiple generative AI models may be used that each generate different resulting queries. In these embodiments, multiple generative AI response engines 302(*a-n*) may be implemented to handle the generative AI responses from the multiple generative AI response engines 302(*a-n*).

An AI engine selection module 318 may include software and/or logic to provide the functionality for selecting between multiple AI engines based on various business criteria. For example, the resulting responses received from one of the multiple generative AI engines 302(*a-n*) may be more appropriate and/or more tailored to the requesting user of the observability platform based on a context bundle that is generated and/or determined per request. In an embodiment, the generated responses are received in parallel from the multiple generative AI engines 302(*a-n*), and various methods may be employed by the AI engine selection module 318 to determine which response is the best for the requesting user. In other embodiments, A/B testing is employed by the AI engine selection module 318 to determine which response best meets the needs of the requesting user based on user feedback. In further embodiments, experimentation, testing, and validation methods and techniques may be used by the AI engine selection module 318 to select between the multiple generative AI response engines 302(*a-n*).

The query building engine 104 may also include query history in a context bundle that is generated and/or determined per request. For example, recently-run queries may be incorporated as part of a context bundle based on a combination of recency and uniqueness of a query shape. A typical use case may include a user generating multiple requests in succession, modifying the request based on the results provided from the resulting query. Thus, the recently-run queries may provide important information to the generative AI model to help form the next generative AI response. In an embodiment, a threshold may be determined for recency to ensure a group with a large number of semantically different queries is selected over a group with a large number of semantically similar queries. This context bundle may be used by an AI engine selection module 318 in making the selection between two or more different AI engines. Further, the comparison results module 320 may generate the results of various AI engines that can be compared semantically in addition to using the context bundle generated.

A comparison results module 320 may include software and/or logic to provide the functionality for generating a comparison between results generated by multiple AI engines. For example, different AI engines may produce different results given the same input. One or more parsing, matching and/or comparison techniques may be employed to determine the differences between the resulting responses from the generative AI response engines 302. Thus, the comparison results module 320 enables a comparison of the different results to be generated and processed by one or more modules of the observability platform 130.

A post processing module 316 may include software and/or logic to provide the functionality for generating actions that can modify generated queries, in an embodiment. For example, a JSON-encoded response may be received from a generative AI response engine 302. A pre-parse response cleanup may be performed to adjust values that would prevent parsing into JSON, in an embodiment. Then, the response may be parsed into a JSON format. Then, a validation check may be performed. The post processing module 316 may further register information that is known at query validation time based on the query rules and the existing data schema that is in place in the observability platform 130. If the validation check fails, the information gathered from the query validation time is used to run a large series of potential programmatic corrections including: removing query clauses that have been identified as invalid from the parsed query specification, changing pieces of a query clause to make a whole clause of a query specification valid, making adjustments to specified time ranges and granularity clauses in accordance with established time rules within the observability platform, and inserting new query clauses based on the structure of existing query clauses within the query specification to enhance the query as a whole.

Figure 4:
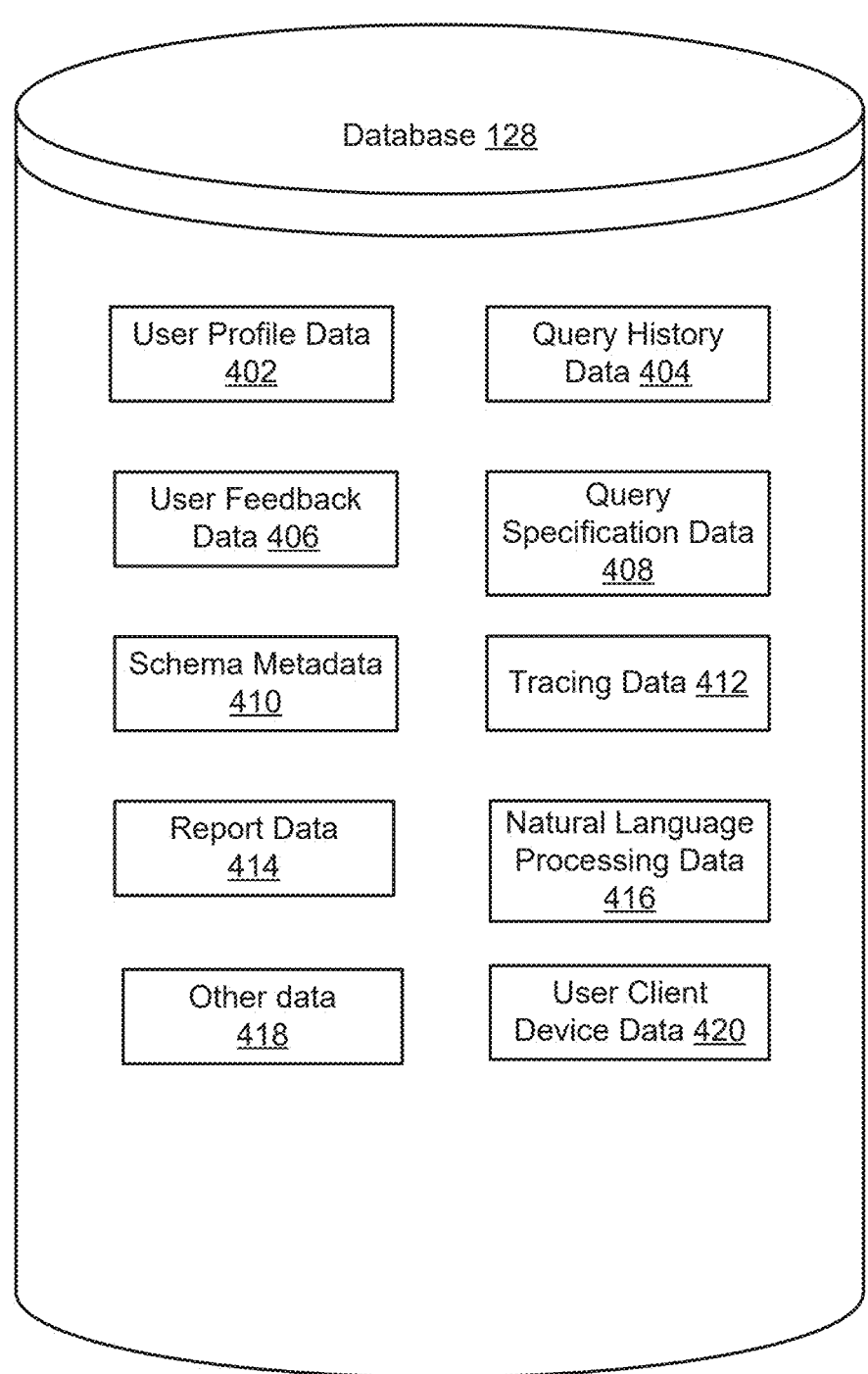
FIG. 4 is a block diagram illustrating a database of the observability platform in accordance with some implementations.

FIG. 4 is a block diagram illustrating a database 128 of the observability platform 130 in accordance with some implementations. As described above, database 128 may be instantiated in a data storage 208 in an example computing device 200 or distributed across multiple computing devices 200 across a distributed data storage 208. Database 128 may include user profile data 402 associated with users 106, query history data 404 that includes the executed queries by users 106, user feedback data 406 that is received based on the executed queries, query specification data 408 that includes the rules of what constitutes a valid query, schema metadata 410 that includes information about the database schemas associated with users 106, tracing data 412 that includes data points representing each request in software applications being monitored by users 106, report data 414 generated by various functional modules of the observability platform 130, natural language processing data 416 that includes dictionaries and/or other special column names and their meaning, other data 418 that includes domain knowledge information, simulated conversations, and instructions to the generative AI engine 122, and user client device data 420 that includes log data and other data received from client devices 108.

FIG. 5 is an example flowchart diagram illustrating a method 500 of query building using generative artificial intelligence in accordance with some implementations.

At 502, a request to use generative artificial intelligence in association with a query on an observability platform is received.

At 504, a first blob of text is generated based on the request.

At 506, the first blob of text based on the request is sent to a generative artificial intelligence web service.

At 508, a decision is made whether a response from the generative artificial intelligence web service meets a threshold quality level. For example, if a query validation module 136 determines that the response is wholly invalid, this does not meet the threshold quality level. A quality threshold may be specified by administrators of the observability platform 130, in an embodiment. This quality threshold may be static and determined as a set of criteria constituting a good response based on analysis done by the administrators of the observability platform 130. This quality threshold may also be algorithmically generated based on general criteria the administrators of the observability platform 130 and may be incorporated with other data gathered contextually. Additionally, this criteria may be dynamically updated over time on a per-user, per-organization, and per-schema basis. As another example, the query validation module 136 may determine a likelihood of successful execution of the response as a query in the observability platform 130 based on one more probability models using past historically executed queries. As a further example, the query validation module 136 may determine a score that validates the response according to a query specification document. Any number of validation methods and techniques may be used.

If the response from the generative artificial intelligence web service meets the threshold quality level, then at 512, the response is executed as the query on the observability platform. At 514, optionally, user feedback is received on the query on the observability platform.

If the response from the generative artificial intelligence web service does not meet the threshold quality level, then at 510 the response is modified to comply with one or more query specification rules. The method 500 then repeats the decision point at 508. In an embodiment, if the response cannot be modified, the method 500 ends and the user 106 is prompted to try another user input.

FIG. 6 is an example flowchart diagram illustrating a method 600 of generating a blob of text to send to a generative artificial intelligence web service in accordance with some implementations.

At 602, a request is received to generate a blob of text in association with a query on an observability platform 130, the request including user input.

At 604, query specification data is retrieved.

At 606, the blob of text is generated based on the user input and the retrieved query specification data.

At 608, the blob of text is sent to a generative artificial intelligence web service.

At 610, a decision is made whether a response from the generative artificial intelligence web service meets a threshold quality level, similar to decision point 508 in FIG. 5.

If the response from the generative artificial intelligence web service meets the threshold quality level, then at 614 the response is executed as the query on the observability platform and at 616, optionally, user feedback is received on the query on the observability platform.

If the response from the generative artificial intelligence web service does not meet the threshold quality level, then at 612 the blob of text is modified to comply with one or more query specification rules. The method 600 then moves to step 606 to generate the blob based on the user input and query specification data. In an embodiment, if the response is wholly invalid, the method 600 stops and the user is prompted to try again by entering new user input.

Figure 7:
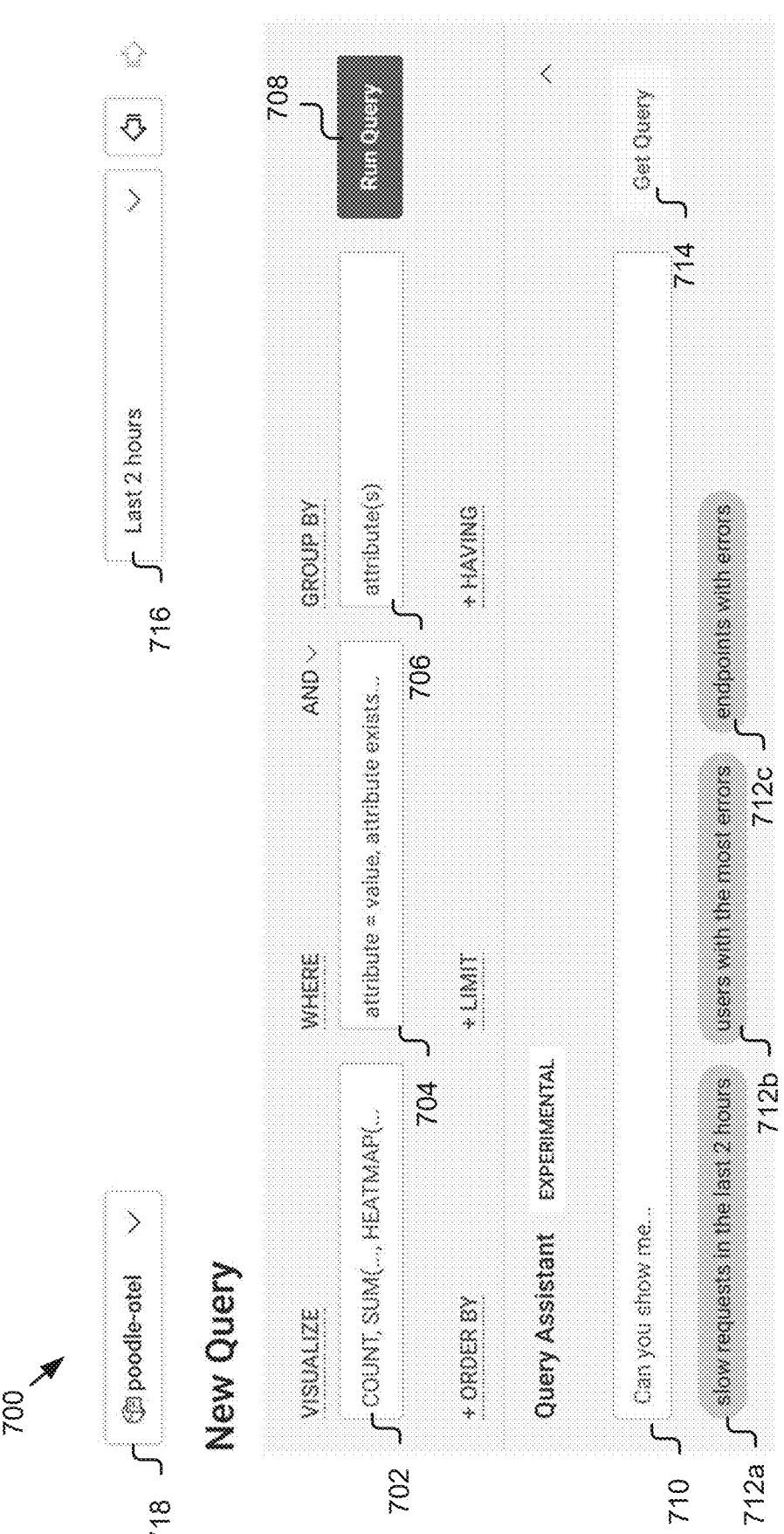
FIG. 7 is an example screenshot illustrating an example query building user interface of the observability platform in accordance with an implementation.

FIG. 7 is an example screenshot illustrating an example query building user interface 700 of the observability platform 130 in accordance with an implementation.

User interface element 702 includes options selected for visualization, including count and sum in a heatmap visualization. User interface element 704 includes options for filters, such as attribute=value, attribute exists, and so forth. User interface element 706 includes options for group by values, such as attributes. Button 708 enables the user to run the query.

Text field 710 enables the user to input natural language as input. User interface elements 712 enable the user to select from "pills" that may be pre-programmed as highly requested natural language queries. In an embodiment, the natural language queries that appear as user interface elements 712 may change based on a user 106. In another embodiment, the "pills" user interface elements 712 may remain static. In another embodiment, the "pills" may be generated by the generative AI service 122 based on user activity and the end-user's dataset schema. For example, user interface element 712a includes "slow requests in the last 2 hours," user interface element 712b includes "users with the most errors," and user interface element 712c includes "endpoints with errors." Upon selection of any user interface element 712, the text field 710 can be populated with the natural language phrase. Button 714 may enable the user to "Get Query" from the generative AI engine 122. Drop down menu 716 narrows the data set to data points in the last 2 hours, for example. Drop down menu 718 enables the user to select between different instances, datasets, and/or organizations.

Figure 8:
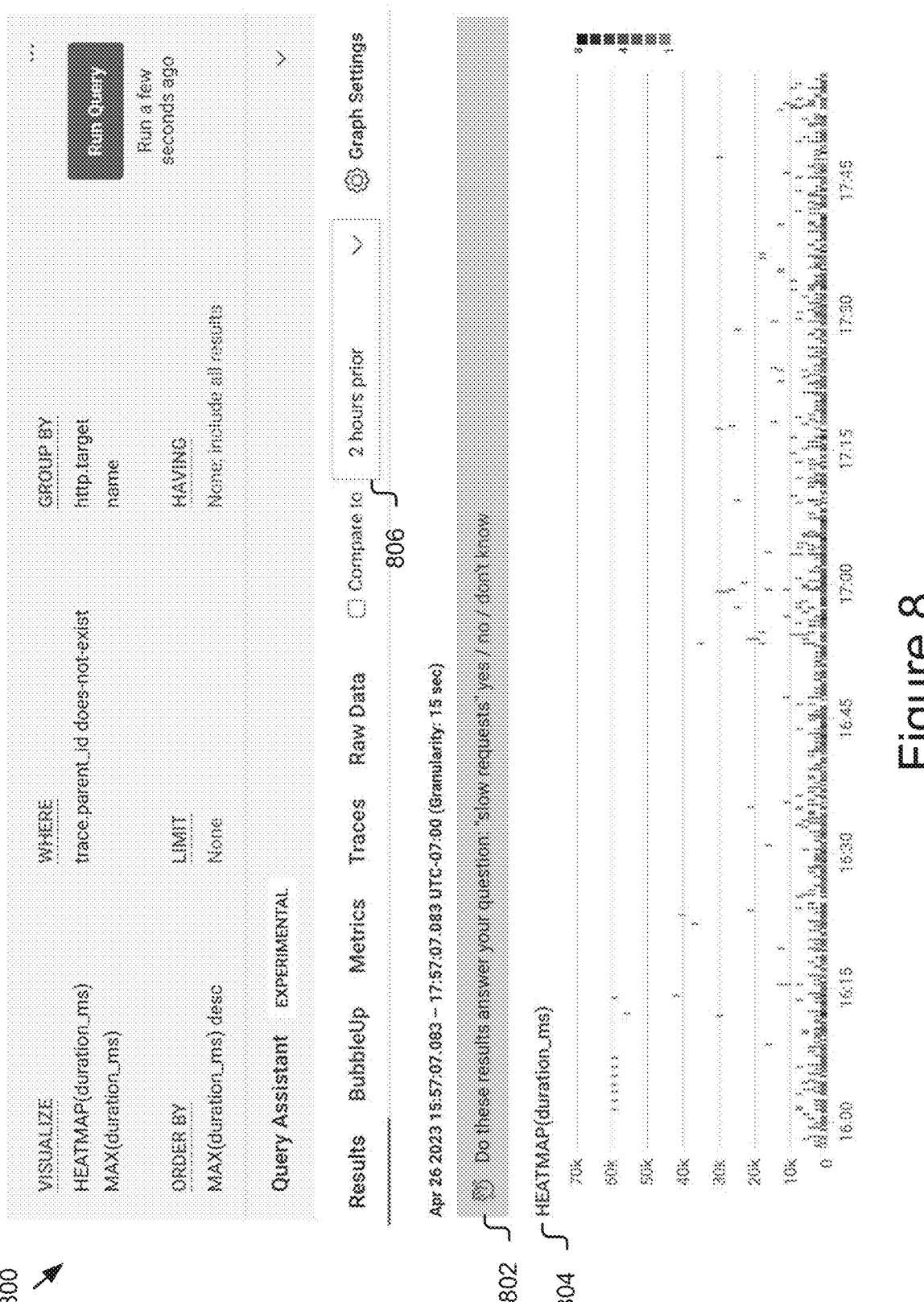
FIG. 8 is an example screenshot illustrating an example heat map visualization user interface of the observability platform in accordance with an implementation.

FIG. 8 is an example screenshot illustrating an example heat map visualization user interface 800 of the observability platform 130 in accordance with an implementation. User interface element 802 includes an example prompt for user feedback, enabling the user to respond to the question "Do these results answer your question: "slow requests" yes/no/don't know" with the words "yes," "no," and "don't know," as selectable links that records the user feedback in the observability platform 130 in the database 128, for example.

Visualization user interface 804 depicts a heatmap (duration_ms) in which data points are plotted across a y-axis of duration in milliseconds that increases by 10 k upwards to 70 k, and across an x-axis of time from 16:00 to 18:00 in fifteen minute increments. The data points are color-coded such that darker data points reflect a higher number of requests and that lighter data points reflect a lower number of requests. As described above, the heatmap visualization interface 804 is selectable such that each data point can be selected by a user 106. Drop down menu 806 enables the user to specify the timeframe of the dataset, such as "2 hours prior," for example.

Figure 9:
FIG. 9 is an example screenshot illustrating an example max results visualization user interface of the observability platform in accordance with an implementation.

FIG. 9 is an example screenshot illustrating an example max results visualization user interface 900 of the observability platform in accordance with an implementation. User interface element 902 depicts a chart with color-coded line graphs showing spikes in the MAX duration in milliseconds, along a y-axis in 10 k increments upwards to 70 k and a timeline across the x-axis from 16:00 to 18:00 in fifteen minute increments. Each line is selectable, such as line 904. Data analysis engine 126 may be used to generate this data, in an embodiment.

It should be understood that other processors, operating systems, sensors, displays, and physical configurations are possible.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

In some instances, various implementations may be presented herein in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code, such as the computing systems, entities, and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
receiving a request to use generative artificial intelligence in association with a query on an observability platform;
generating a first blob of text based on the request;
sending the first blob of text based on the request to a generative artificial intelligence web service;
receiving a response from the generative artificial intelligence web service;
generating a validated response by validating that the response meets a threshold quality level by pre-parsing and processing the response into a test query in a data serialization format and determining the response meets the threshold quality level based on applying one or more query specification rules to the test query, wherein the threshold quality level is determined to be met based, in part, on other quality criteria that is dynamically adjusted based on historical querying data, different database schemas, and user interactions with the observability platform;
executing the validated response as the query on the observability platform; and
responsive to determining that the response does not meet the threshold quality level, modifying the response to comply with one or more query specification rules,
wherein modifying the response to comply with the one or more query specification rules comprises:
pre-parsing and processing the response into a new query in the data serialization format;
identifying one or more portions of the response that prevents validating a parsed data serialization format object into a query format based, in part, on the one or more query specification rules;
modifying the one or more portions of the response to create a modified response, wherein the modifying comprises one or more of: removing the one or more portions of the response, updating the one or more portions, or inserting one or more new portions programmatically; and
executing the modified response as the query in the observability platform.

2. The computer-implemented method of claim 1, further comprising:
receiving user feedback on the query on the observability platform.

3. The computer-implemented method of claim 1, wherein the first blob of text based on the request is further generated based on:
a description of the one or more query specification rules;
a database schema of the observability platform;
a list of algorithmically-generated relevant names of columns from the database schema;
a list of domain knowledge metadata;
a list of user-provided named examples of queries;
an existing query specification;
a set of examples simulating a conversation with a generative artificial intelligence (AI) web service; and
a set of instructions to produce the query in executable programmatic code.

4. The computer-implemented method of claim 1, wherein the threshold quality level is determined to be met based on a set of rules known statically to constitute a valid query, a historical record of executed queries used to generate a likelihood of the response to be validly executed as the query on the observability platform, and wherein the other quality criteria is algorithmically-determined further based on historical usage, dataset schema contents, and at least one of per-user and per-organization behavior on the observability platform.

5. The computer-implemented method of claim 1, wherein the executed query on the observability platform is further acted upon, including at least one of naming the executed query, assigning the executed query to a collection of queries, and making the executed query a decision point that causes another action to be performed.

6. The computer-implemented method of claim 1, further comprising:
generating a code snippet based, in part, on the one or more query specification rules; and
inserting the code snippet into the modified response.

7. The computer-implemented method of claim 1, wherein the data serialization format comprises JavaScript Object Notation (JSON) format and wherein the data serialization format object comprises a JSON object.

8. A system comprising one or more processors and memory operably coupled with the one or more processors, wherein the memory stores instructions that, in response to execution of the instructions by one or more processors, cause the one or more processors to perform operations including:

receiving a request to use generative artificial intelligence in association with a query on an observability platform;

generating a first blob of text based on the request;

sending the first blob of text based on the request to a generative artificial intelligence web service;

receiving a response from the generative artificial intelligence web service;

generating a validated response by validating that the response meets a threshold quality level by pre-parsing and processing the response into a test query in a data serialization format and determining the response meets the threshold quality level based on applying one or more query specification rules to the test query, wherein the threshold quality level is determined to be met based, in part, on other quality criteria that is dynamically adjusted based on historical querying data, different database schemas, and user interactions with the observability platform;

executing the validated response as the query on the observability platform; and responsive to determining that the response does not meet the threshold quality level, modifying the response to comply with one or more query specification rules, wherein modifying the response to comply with the one or more query specification rules comprises:

pre-parsing and processing the response into a new query in the data serialization format;

identifying one or more portions of the response that prevents validating a parsed data serialization format object into a query format based, in part, on the one or more query specification rules;

modifying the one or more portions of the response to create a modified response, wherein the modifying comprises one or more of: removing the one or more portions of the response, updating the one or more portions, or inserting one or more new portions programmatically; and executing the modified response as the query in the observability platform.

9. The system of claim 8, wherein the operations further comprise:

receiving user feedback on the query on the observability platform.

10. The system of claim 8, wherein the first blob of text based on the request is further generated based on:

a description of the one or more query specification rules;

a database schema of the observability platform;

a list of algorithmically-generated relevant names of columns from the database schema;

a list of domain knowledge metadata;

a list of user-provided named examples of queries;

an existing query specification;

a set of examples simulating a conversation with a generative artificial intelligence (AI) web service; and a set of instructions to produce the query in executable programmatic code.

11. The system of claim 8, wherein the threshold quality level is determined to be met based on a set of rules known statically to constitute a valid query, a historical record of executed queries used to generate a likelihood of the response to be validly executed as the query on the observability platform, and wherein the other quality criteria is algorithmically-determined further based on historical usage, dataset schema contents, and at least one of per-user and per-organization behavior on the observability platform.

12. The system of claim 8, wherein the executed query on the observability platform is further acted upon, including at least one of naming the executed query, assigning the executed query to a collection of queries, and making the executed query a decision point that causes another action to be performed.

13. The system of claim 8, wherein the operations further comprise:

generating a code snippet based, in part, on the one or more query specification rules; and inserting the code snippet into the modified response.

14. The system of claim 8, wherein the data serialization format comprises JavaScript Object Notation (JSON) format and wherein the data serialization format object comprises a JSON object.

15. One or more non-transitory computer-readable storage media storing one or more sequences of instructions which, when executed using one or more processors, cause the one or more processors to execute a method comprising:

receiving a request to use generative artificial intelligence in association with a query on an observability platform;

generating a first blob of text based on the request;

sending the first blob of text based on the request to a generative artificial intelligence web service;

receiving a response from the generative artificial intelligence web service;

generating a validated response by validating that the response meets a threshold quality level by pre-parsing and processing the response into a test query in a data serialization format and determining the response meets the threshold quality level based on applying one or more query specification rules to the test query, wherein the threshold quality level is determined to be met based, in part, on other quality criteria that is dynamically adjusted based on historical querying data, different database schemas, and user interactions with the observability platform;

executing the validated response as the query on the observability platform; and responsive to determining that the response does not meet the threshold quality level, modifying the response to comply with one or more query specification rules, wherein modifying the response to comply with the one or more query specification rules comprises:

pre-parsing and processing the response into a new query in the data serialization format;

identifying one or more portions of the response that prevents validating a parsed data serialization format object into a query format based, in part, on the one or more query specification rules;

modifying the one or more portions of the response to create a modified response, wherein the modifying comprises one or more of: removing the one or more portions of the response, updating the one or more portions, or inserting one or more new portions programmatically; and executing the modified response as the query in the observability platform.

16. The one or more non-transitory computer-readable storage media of claim 15, wherein the method further comprises:

receiving user feedback on the query on the observability platform.

17. The one or more non-transitory computer-readable storage media of claim 15, wherein the first blob of text based on the request is further generated based on:

a description of the one or more query specification rules;

a database schema of the observability platform;

a list of algorithmically-generated relevant names of columns from the database schema;

a list of domain knowledge metadata;

a list of user-provided named examples of queries;

an existing query specification;

a set of examples simulating a conversation with a generative artificial intelligence (AI) web service; and a set of instructions to produce the query in executable programmatic code.

18. The one or more non-transitory computer-readable storage media of claim 15, wherein the threshold quality level is determined to be met based on a set of rules known statically to constitute a valid query, a historical record of executed queries used to generate a likelihood of the response to be validly executed as the query on the observability platform, and wherein the other quality criteria is algorithmically-determined further based on historical usage, dataset schema contents, and at least one of per-user and per-organization behavior on the observability platform.

19. The one or more non-transitory computer-readable storage media of claim 15, wherein the method further comprises:

generating a code snippet based, in part, on the one or more query specification rules; and inserting the code snippet into the modified response.

20. The one or more non-transitory computer-readable storage media of claim 15, wherein the data serialization format comprises JavaScript Object Notation (JSON) format and wherein the data serialization format object comprises a JSON object.

* * * * *